US009405717B2

(12) United States Patent
Brontvein et al.

(10) Patent No.: US 9,405,717 B2
(45) Date of Patent: Aug. 2, 2016

(54) MEMORY DEVICE DEBUGGING ON HOST PLATFORMS

(71) Applicant: SanDisk Technologies Inc., Plano, TX (US)

(72) Inventors: Gabi Brontvein, Rishon LeZiyyon (IL); Inon Cohen, Oranit (IL); Asaf Gueta, Or Yehuda (IL)

(73) Assignee: SanDisk Technologies LLC, Plano, TX (US)

( * ) Notice: Subject to any disclaimer, the term of this patent is extended or adjusted under 35 U.S.C. 154(b) by 219 days.

(21) Appl. No.: 14/086,531

(22) Filed: Nov. 21, 2013

(65) Prior Publication Data

US 2015/0143017 A1    May 21, 2015

(51) Int. Cl.
*G06F 13/14* (2006.01)
*G06F 11/00* (2006.01)
*G06F 13/40* (2006.01)

(52) U.S. Cl.
CPC .................................. *G06F 13/4022* (2013.01)

(58) Field of Classification Search
CPC ........ G06F 13/12; G06F 3/061; G06F 3/0658
USPC .......................................................... 710/316
See application file for complete search history.

(56) References Cited

U.S. PATENT DOCUMENTS

| 6,622,195 | B2* | 9/2003 | Osakada | G06F 13/4022 710/305 |
| 6,654,841 | B2* | 11/2003 | Lin | H05K 5/0278 361/679.32 |
| 6,857,038 | B2* | 2/2005 | Liu | G06K 19/07732 235/441 |
| 7,672,803 | B1 | 3/2010 | Lee et al. | |
| 7,809,866 | B2* | 10/2010 | Liu | G06K 19/077 710/2 |
| 8,549,337 | B2* | 10/2013 | Odaguchi | G06F 1/3237 713/320 |
| 2008/0144375 | A1 | 6/2008 | Cheng | |

\* cited by examiner

*Primary Examiner* — Titus Wong
(74) *Attorney, Agent, or Firm* — Brinks Gilson & Lione

(57) ABSTRACT

A system and method are disclosed for an electronic integrated circuit to communicate with different hosts via different interfaces using the same host protocol. The system may use a host interface circuit to select a first set of electrical contacts or a second set of electrical contacts in order for a first host or a second host, respectively, to communicate with the electronic integrated circuit using a host protocol. The method may include switching from communicating with the first host using the first set of electrical contacts to communicating with the second host using the second set of electrical contacts in order for the second host to test the electronic integrated circuit.

19 Claims, 8 Drawing Sheets

MEMORY DEVICE DEBUGGING ON HOST PLATFORMS

TECHNICAL FIELD

This application relates generally to debugging an integrated circuit. More specifically, this application relates to debugging a memory device installed within a host platform.

BACKGROUND

Integrated circuits, such as memory devices, are often installed within a host device. For example, the integrated circuits may be installed in a printed circuit board via soldering or other type of connection method. After installation, the integrated circuit may provide functionality to the host device.

There are instances where it is desirable to test the integrated circuit. Testing on the integrated circuit may be performed either before installation within the host device or after installation. One way to test the integrated circuit after installation is to remove the integrated circuit from the host device. However, this may prove difficult and may damage the integrated circuit in the process.

BRIEF SUMMARY

A system and method are disclosed for an electronic integrated circuit to communicate with different hosts via different interfaces using the same protocol.

According to a first aspect, an electronic integrated circuit that is configured to communicate with one of multiple hosts is disclosed. The electronic integrated circuit includes: electronic circuitry configured to perform at least one function and configured to communicate using a host protocol; a package configured to house the electronic circuitry; first set of electrical contacts on an exterior of the package and configured for communication with a first host via the host protocol; a second set of electrical contacts on the exterior of the package and configured for communication with a second host via the host protocol; and a host interface switch configured to input one or more signals to select some or all of the first set of electrical contacts or to select some or all of the second set of electrical contacts in order for one of the first host or the second host to communicate with the electronic circuitry via the host protocol. For example, the electronic circuitry may comprise a hardware core, with the host interface switch enabling either the first host or the second host to communicate with the same hardware core via the host protocol. As another example, the electronic circuitry may comprise a memory controller and a memory. Further, logic configured to control the host interface switch may be resident within the electronic integrated circuit or external to the electronic integrated circuit. When resident within the electronic integrated circuit, the logic may receive one or more mode signals, determine a mode (such as a test mode), and then configure the host interface switch based on the determined mode. In this regard, when the electronic integrated circuit is installed within the first host (such as installed within a smartphone, tablet or the like), the second host may communicate with the electronic circuitry using the host interface switch without removing the electronic circuitry from the first host.

In a second aspect, a method for an electronic integrated circuit to communicate with one of multiple hosts is disclosed. The method includes: communicating, via a first set of electrical contacts using a host protocol, with a first host, the electronic integrated circuit embedded within the first host, the first set of electrical contacts on an exterior of a package of the electronic integrated circuit; receiving one or more signals to select the second set of electrical contacts for testing of at least a part of the electronic integrated circuit, the second set of electrical contacts on the exterior of the package of the electronic integrated circuit; and based on the one or more signals received, switching, using a host interface switch, from communicating with some or all of the first set of electrical contacts and communicating with some or all of the second set of electrical contacts using the host protocol in order for the second host to test the at least a part of the electronic integrated circuit.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
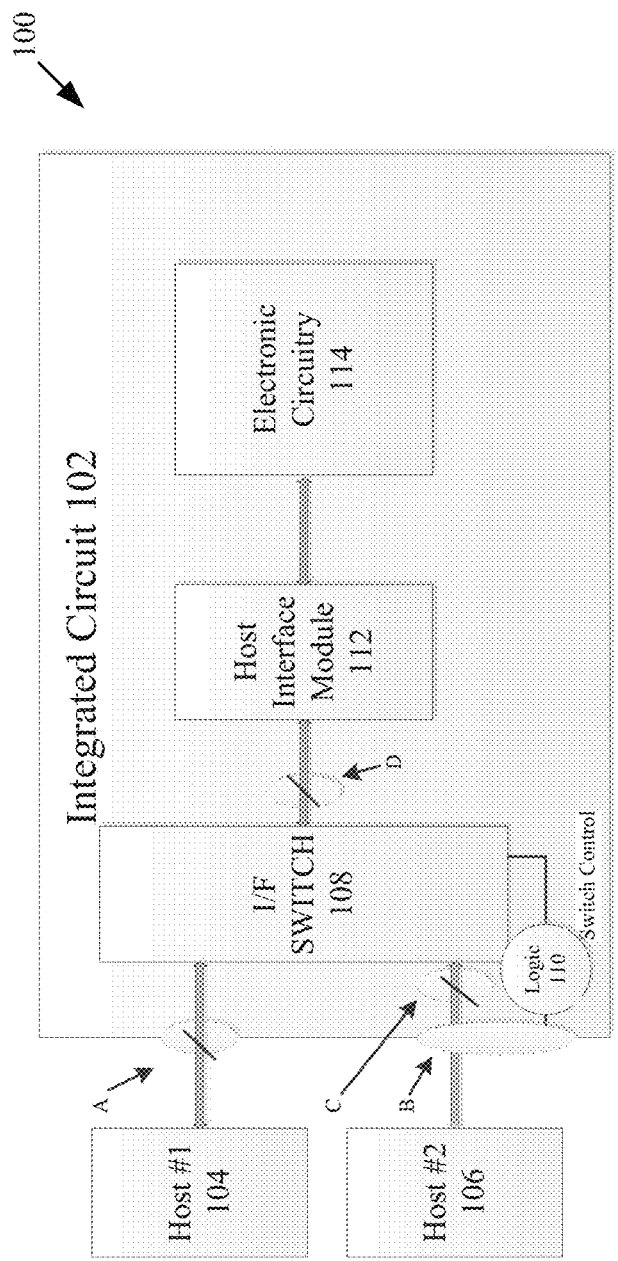
FIG. 1 illustrates a first example of an integrated circuit communicating with two different hosts via two respective host interfaces that use the same hardware.

Integrated circuits may include electronic circuitry that is configured to perform one or more functions. Examples of functions include, but are not limited to, processing (such as a microprocessor), storage (such as a memory device), or the like. Other functions are contemplated. The integrated circuits may be installed within a host platform. The installation may comprise soldering the integrated circuit into a printed circuit board within the host platform. Other types of installation are contemplated.

In one example, the integrated circuit may comprise a memory device. Embedded applications, such as digital cameras, smart phones, and tablets, typically store their content on flash memory. In the past, this arrangement necessitated a dedicated controller to manage the reading and writing of data, driven by the application CPU. Instead of the controller managing these functions from outside the flash memory die, the controller may be bundled onto the flash die.

Several types of protocols for the host device to communicate with the memory device are contemplated. One type of protocol is eMMC ("embedded Multi-Media Controller").

eMMC may be used, for example, in an embedded non-volatile memory system comprised of both flash memory and a flash memory controller integrated on the same package. The eMMC devices may comprise three components, the MMC (multimedia card) interface, the flash memory, and the flash memory controller. Other components are contemplated. Thus, the eMMC architecture integrates the flash memory controller in the same package, thereby simplifying the application interface design and freeing the host processor from low-level flash memory management.

An eMMC device may communicate with its host platform in one of a variety of ways. For example, one or more standards may be used in communicating with eMMC including: v4.41 as defined in JESD84-A441; Embedded MultiMediaCard (eMMC) Product Standard v4.41 and JESD84-B45; Embedded MultiMediaCard (eMMC), Electrical Standard (Version 4.5 Device) for eMMC v4.5. Other protocols for the host platform to communicate with the eMMC are contemplated.

The eMMC device may be assembled in a ball grid array (BGA) package. The BGA package is one type of surface-mount packaging used to mount devices, such as eMMC devices, to a host platform. The eMMC device may be attached to a printed circuit board on the host platform by soldering. Other types of attachment are contemplated.

However, bundling the controller with the flash die may make testing of parts of the memory device more difficult. More specifically, because the eMMC device is soldered into the host platform, testing the controller by removing the eMMC device is difficult and may damage the eMMC device in the process.

In order to test the integrated circuit without extracting the integrated circuit from the host platform, the integrated circuit is configured with two (or more) host interfaces. For example, a memory device may include two (or more) host interfaces that use the same hardware core and use the same host protocol to communicate with the hardware core, as discussed in more detail below.

FIG. 1 illustrates a first example of an integrated circuit 102 communicating with two different hosts 104, 106 via two respective host interfaces that use the same hardware. More specifically, FIG. 1 illustrates a block diagram of a system 100 that including Host #1 (104) and Host #2 (106) connected to integrated circuit 102 via two separate interfaces using the same host protocol.

Host interface for Host #1 (104) is illustrated in FIG. 1 as host interface "A". In one embodiment, host interface "A" may comprise multiple communication lines configured to communicate with part or all of the hardware core of integrated circuit 102. As discussed below with respect to FIGS. 4-6, host interface "A" may comprise standard eMMC I/F balls. Host interface for Host #2 (106) is illustrated in FIG. 1 as host interface "B". In one embodiment, host interface "B" may comprise multiple communication lines, some of which are configured to communicate with part or all of the hardware core of integrated circuit 102 and at least one communication line configured to communicate with logic 110. As discussed below with respect to FIGS. 4-6, host interface "B" may comprise Vendor Specific Function (VSF) balls. Further, as discussed above, eMMC is merely one example of a host device communication protocol; other protocols are contemplated.

FIG. 1 further illustrates integrated circuit 102. Integrated circuit 102 comprises I/F switch 108, logic 110, host interface module 112, and electronic circuit 114. As illustrated in FIG. 1, I/F switch 108 is in communication with host interface module 112, which, in turn, is in communication with electronic circuitry 114.

In operation, one of host interface "A" or host interface "B" is electrically connected with the hardware core of the integrated circuit 102. In one embodiment, a small hardware circuit enables the electrical connection between one of host interface "A" or host interface "B". The small hardware circuit may comprise one or more switches, such as I/F switch 108, and the logic to control the one or more switches, such as logic 110. The I/F switch 108 may be between the hardware interfaces on one side (e.g., host interface "A" and host interface "B") and the hardware core of the integrated circuit on the other side (e.g., host interface module 112 and electronic circuit 114). More specifically, in one embodiment, host interface module 112 is configured to be connected, via I/F switch 108, with one of host #1 (104) or host #2 (106). An example of I/F switch 108 is disclosed in FIG. 3.

Host interface module 112 is configured to act as the interface between the electronic circuitry 114 and a host (host #1 (104) or host #2 (106)), thereby enabling the electronic circuitry 114 to communicate with the host. More specifically, the host interface module may include circuitry or other type of hardware to enable the electronic circuitry 114 to communicate with the host. In an alternate embodiment, the circuitry configured to act the interface to the host may be internal to electronic circuitry 114.

Figure 3:
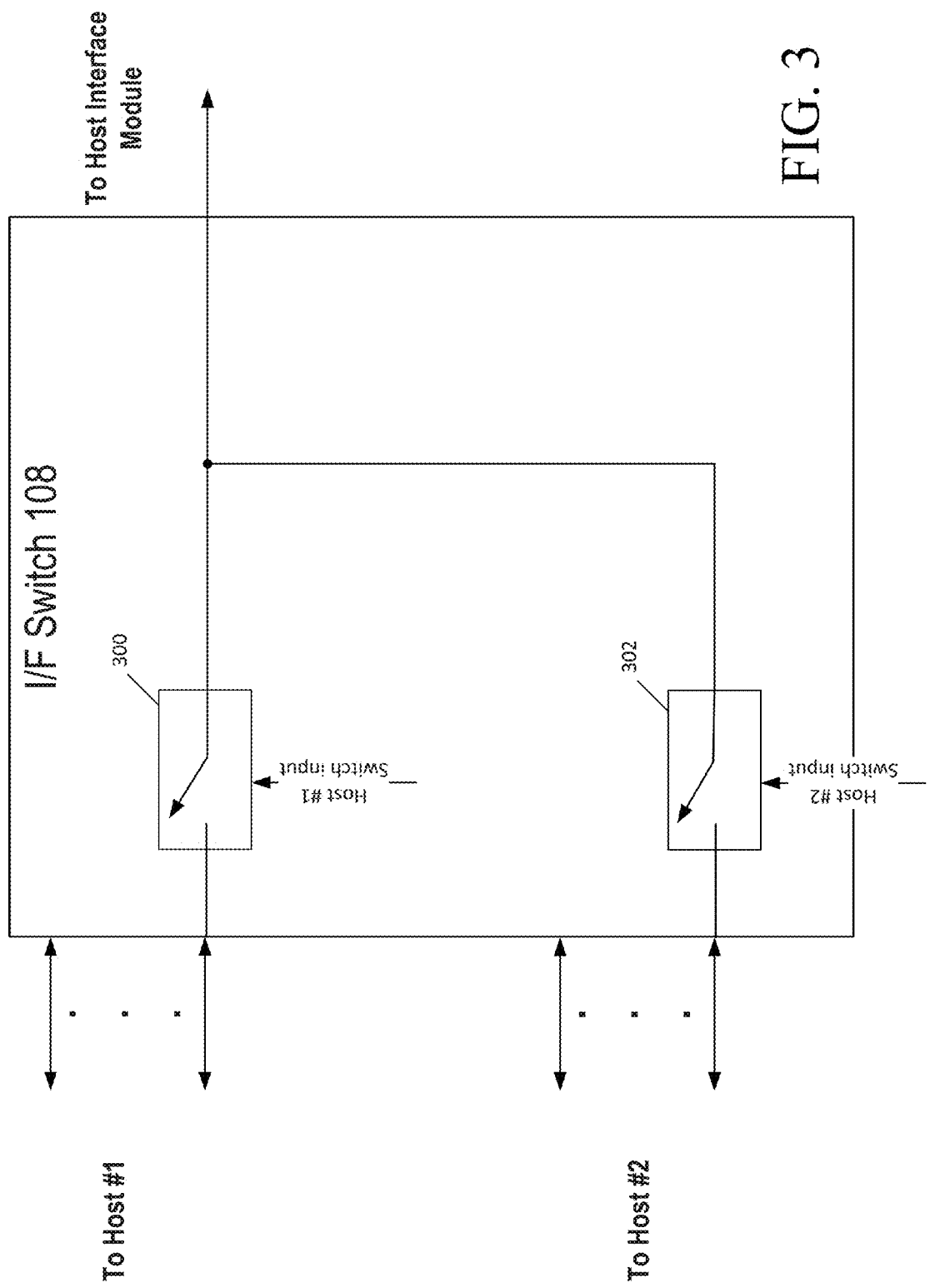
FIG. 3 illustrates an example of an I/F switch.

The I/F switch 108, controlled by logic 110, may enable electrical connection of one of the host interfaces with the hardware core. In one embodiment, I/F switch 108 comprises a bank of solid-state electronic switches, such as transistors. The bank may comprise one or more switches, such as illustrated in FIG. 3. For example, logic 110 may be configured to control I/F switch 108 in one or more configurations. In one configuration, one or more communication lines from host interface "A" are electrically connected to the electronic circuitry 114 via host interface module 112. In a second configuration, one or more communication lines from host interface "B" are electrically connected to the electronic circuitry 114 via host interface module 112.

Logic 110 receives as input one or more signals. As shown in FIG. 1, the one or more signals input to logic 110 are communicated via one or more communication lines from host interface "B". In an alternate embodiment, host interface "A" inputs the one or more signals to logic 110.

In one embodiment, the integrated circuit 102 may be embedded within one host (such as Host #1 (104)), as discussed in more detail below. In this regard, the other host (such as Host #2 (106)) may communicate with the integrated circuit 102 by communicating via the one host.

In operation, one of the hosts may be enabled by default. In the example of the integrated circuit 102 being embedded in Host #1 (104), the interface for Host #1 (104) may be enabled by default after powerup. In such a default (or normal) mode, one, some, or all of the lines from host interface "A" are connected, via I/F switch 108, to interface "D". In this regard, the default is for Host #1 104 to be connected to interface "D". As discussed above, Host #1 may comprise a smartphone, a tablet device, or other consumer electronic device that can integrate flash memory. Thus, after powerup or other type of restart, the consumer electronic device may be in communication with the flash memory.

As shown in FIG. 1, interface "D" is electrically connected to host interface module 112, and, in one embodiment, may serve as the interface to the hardware core (such as electronic circuitry 114) of integrated circuit 102. For example, host interface "A" may comprise 8 electrical connections and interface "D" may comprise 8 electrical connections. Thus, in the default mode, the 8 lines from host interface "A" are electrically connected to interface "D". Alternatively, fewer than all of the lines from host interface "A" may be electrically connected to interface "D". In the default mode, Host #1 (104) may communicate with the hardware core of integrated circuit 102 via a designated protocol of the hardware core. In this regard, the hardware core of the integrated circuit 102 communicates with either host (e.g., host #1 (102) or host #2 (104)) using the same designated protocol.

Logic 110 may send a switch control command (or multiple switch control commands) to I/F switch 108 in order to change the configuration of I/F switch 108 from the default configuration to a non-default configuration (e.g., a test configuration). In the non-default configuration, I/F switch 108 is configured to electrically connect one, some, or all of the lines from host interface "B" to interface "D". As shown in FIG. 1, a subset (or less than all) of the lines from host interface "B" are electrically connected to interface "D" in the non-default configuration. More specifically, one or more signals are input via host interface "B" to logic 110 in order for logic 110 to control I/F switch 108 to the desired configuration. Alternatively, the one or more signals input to logic 110 may be communicated via an interface different from host interface "B".

At least one of the signals input to logic 110 may be used by logic 110 to determine the configuration of I/F switch 108. For example, the signal may be indicative to logic 110 for logic 110 to instruct I/F switch 108 to a specific configuration. More specifically, the signal may be indicative of a specific configuration of I/F switch 108 (e.g., the second configuration), and in response to receipt of the signal, logic 110 may send a switch control command to I/F switch 108 to the specific configuration (e.g., send a switch control command so that I/F switch 108 configures itself to the second configuration).

Optionally, logic 110 may receive one or more signals in addition to the signal to determine the configuration of I/F switch 108. For example, logic 110 may receive a password signal in order for logic 110 to determine whether to accept the signal to determine the configuration of I/F switch 108. In particular, logic 110 may compare the password signal and, if matching a password stored in logic 110, comply with the switch control command, as discussed in more detail below.

Responsive to an input signal to logic 110 to change to the second configuration (e.g., wherein one, some or all of the communication lines from host interface "B" are electrically connected to the hardware core of the integrated circuit 102), logic 110 sends a switch control command in order to command I/F switch 108 to change to the second configuration. As illustrated in FIG. 1, interface "C", which is a subset of host interface "B", is electrically connected to interface "D".

Though FIG. 1 illustrates two host interfaces for integrated circuit 102, in an alternate embodiment, additional host interfaces may be included such that the integrated circuit 102 may communicate with more than two hosts.

Figure 2:
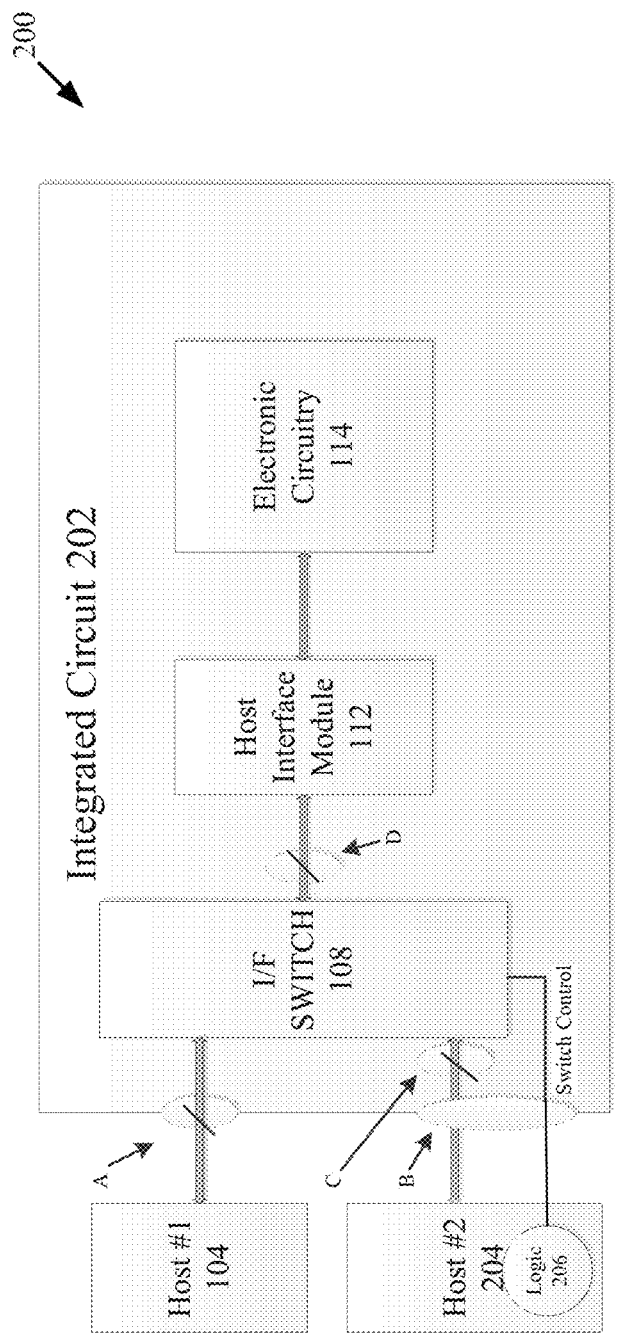
FIG. 2 illustrates a second example of an integrated circuit communicating with two different hosts via two respective host interfaces that use the same hardware.

FIG. 2 illustrates a second example of an integrated circuit 202 communicating with two different hosts 104, 204 via two respective host interfaces that use the same hardware. More specifically, FIG. 2 illustrates a block diagram of a system 200 that including Host #1 (104) and Host #2 (204) connected to integrated circuit 102 via two separate interfaces using the same host protocol.

FIG. 2 is similar to FIG. 1 except that the logic for determining the configuration of I/F switch 108 is located external to the integrated circuit. In particular, in FIG. 1, logic 110 is located within integrated circuit 102. In FIG. 2, logic 206 is located external to integrated circuit 202. In this regard, logic 206 may generate a switch control signal, similar to the switch control signal generated by logic 110. However, the switch control signal generated by logic 206 may be communicated via host interface "B" and input to I/F switch 108, as illustrated in FIG. 2.

FIG. 3 illustrates one example of I/F switch 108. On one side, I/F switch 108 may be electrically connected with multiple hosts, such as host #1 (104) and host #2 (106). Further, I/F switch 108 may be electrically connected with a host interface module, such as host interface module 112. I/F switch 108 may comprise one or more switches, such as switches 300, 302. The switches may comprise transistor switches that receive an input. For ease of illustration, only two switches in I/F switch 108 are shown. However, in one embodiment, each communication line from Host #1 and from Host #2 may be connected to a separate switch.

As shown in FIG. 3, switch 300 receives as an input Host #1 switch input, and switch 302 receives as an input Host #2 switch input. In operation, I/F switch 108 either connects the communication lines from Host #1 to the host interface module, or the communication lines from Host #2 to the host interface module. In this regard, switch 300 and switch 302 are in opposite configurations (e.g., when switch 300 is closed, switch 302 is open). To accomplish this, one of multiple designs for I/F switch may be used. In a first design, switch 300 and switch 302 are the same, and Host #1 switch input may be opposite to Host #2 switch input (e.g., when Host #1 switch input is logic HIGH, Host #2 switch input is logic LOW). In a second design, the same input signal is used (Host #1 switch input is the same as Host #2 switch input) and switch 300 is different from switch 302 (e.g., switch 300 is closed when Host #1 switch input is logic HIGH, and switch 302 is closed when Host #2 switch input is logic LOW). FIG. 3 is merely one example of I/F switch 108. Other configurations of I/F switch 108 are contemplated.

Figure 4:
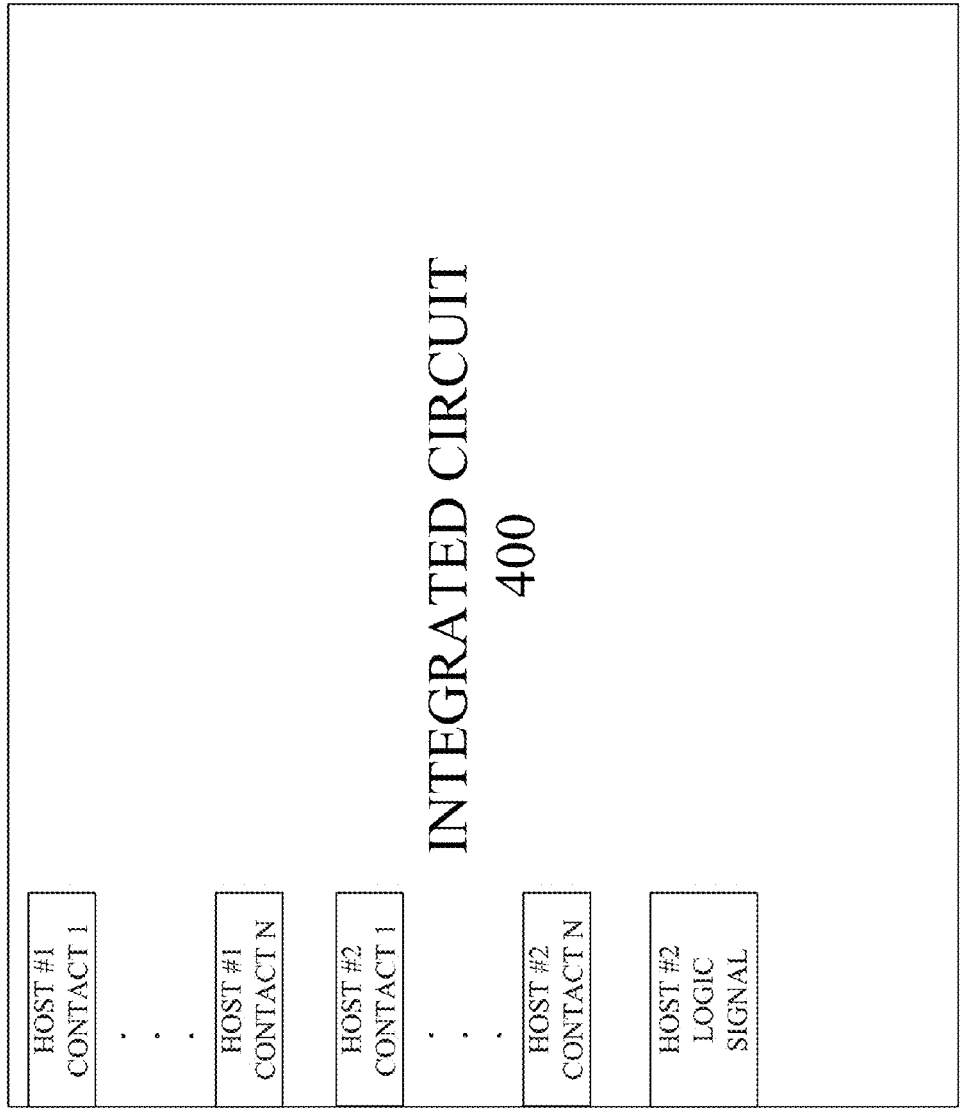
FIG. 4 illustrates the top view of the pins of the integrated circuit package of FIG. 1.

FIG. 4 illustrates the top view of the pins of the integrated circuit package 400 of FIG. 1. Multiple pins of the integrated circuit package 400 may be connected, such as via soldering, to a host. As illustrated in FIG. 4, two hosts (represented by contacts for Host #1 and Host #2) may be connected to the pins of integrated circuit package 400. For example, the integrated circuit package 400 may be connected to Host #1 (104), as discussed above. In this regard, various pins of the integrated circuit package 400 may be connect to Host #1 (104), such as Host #1 contact 1 . . . Host #1 contact N, Host #2 contact 1 . . . Host #2 contact N, and Host #2 logic signal. In this regard, two, three, or more hosts may be connected to the pins of integrated circuit package 400. More specifically, the VSF balls may be connected to the Host #2 pins. In the event of additional VSF balls, more than two hosts may be connected to integrated circuit package 400.

Host #1 contact 1 . . . Host #1 contact N may comprise the contacts associated with host interface "A", as discussed above. More specifically, Host #1 contact 1 . . . Host #1 contact N may comprise the contacts that are configured for communication between integrated circuit package 400 and Host #1 (104).

Host #2 contact 1 . . . Host #2 contact N, and Host #2 logic signal may comprise the contacts associated with host interface "B", as discussed above. More specifically, Host #2 contact 1 . . . Host #2 contact N may comprise the contacts that are configured for communication between integrated circuit package 400 and Host #2 (104), such as interface "C", discussed above. Further, integrated circuit package 400 is configured with logic 110 resident therein. In this regard, one or more signal lines may be input to logic 110. FIG. 4 illustrates a single pin for input (Host #2 logic signal). As discussed above, a mode signal and a password signal may be input. Both the mode signal and the password signal may be input via a single pin. In an alternate embodiment, the mode signal and the password signal may be input via multiple pins. As discussed above, one or more signals may be input to logic 110 in order for logic 110 to determine the configuration of I/F switch 108. The pin for Host #2 logic signal may be used to input to logic 110 in order for logic 110 to determine the configuration of I/F switch 108. Further, logic 110 may optionally require a password prior to changing the configuration of I/F switch 108. In this regard, the pin for Host #2 logic signal may be used to input the password to logic 110.

As discussed above, the integrated circuit package 400 may be soldered within Host #1 (104). In order for Host #2 (106) to communicate with the integrated circuit package 400, Host #1 (104) is configured with an external interface and internal communication lines from the external interface to one or more pins on the integrated circuit package 400. Thus, Host #2 (106) may be connected with external interface of Host #1 (104) and may communicate with various pins on the integrated circuit package 400, such as Host #2 contact 1 ... Host #2 contact N, and Host #2 logic signal. As discussed in more detail below, one, some or all of Host #2 contact 1 ... Host #2 contact N, and Host #2 logic signal may comprise Vendor Specific Function (VSF) pins used by an external device to communicate with an embedded memory.

Figure 5:
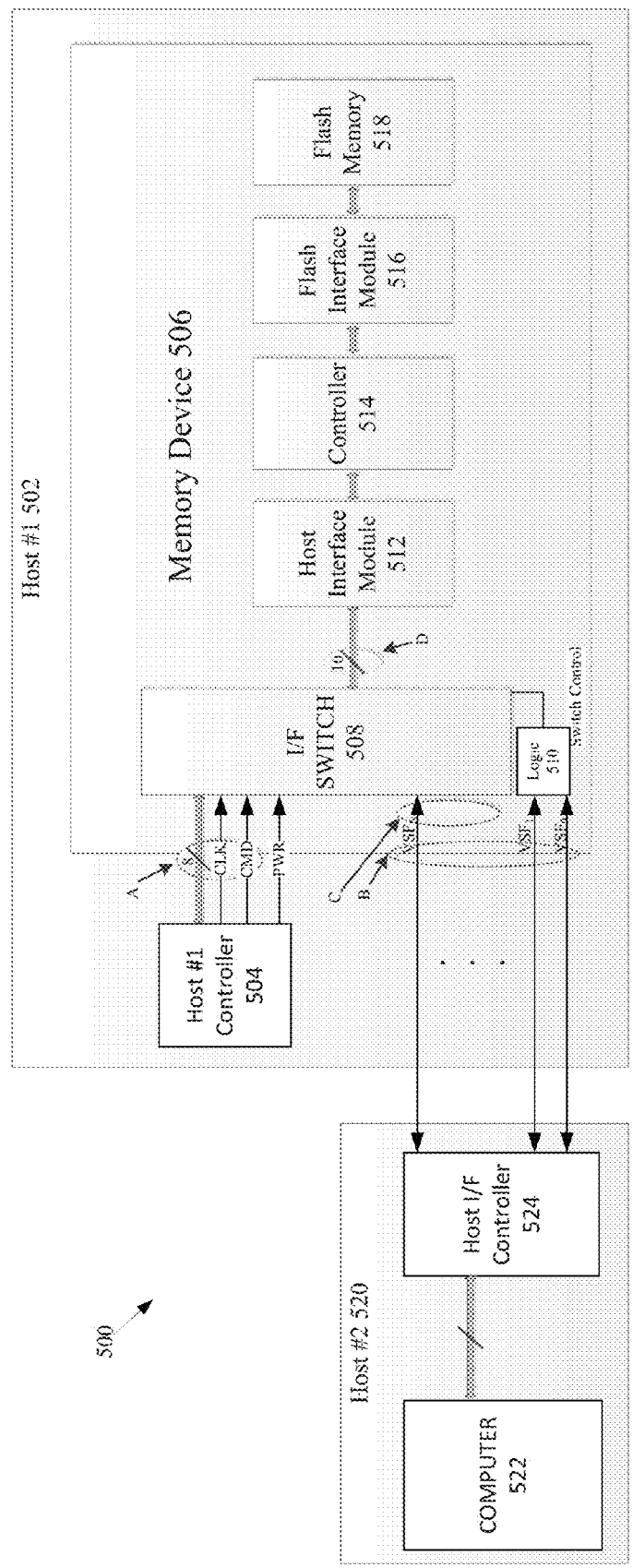
FIG. 5 illustrates a first example of a memory device communicating with two different hosts via two respective host interfaces that use the same hardware.

FIG. 5 illustrates a first example of a memory device 506 communicating with two different hosts 502, 520 via two respective host interfaces that use the same hardware. More specifically, FIG. 5 illustrates a block diagram of a system 500 that including Host #1 (104) and Host #2 (106) connected to integrated circuit 102 via two separate interfaces using the same host protocol.

The memory device 506 of FIG. 5 may include a host interface module 512, a controller 514, a flash interface module 516, and flash memory 518. The host interface module 512 may comprise circuitry configured to interface with one or more hosts, such as Host #1 (502) and Host #2 (520). More specifically, Host #1 controller 504 of Host #1 (502), and one or both of computer 522 or Host I/F controller 524 of Host #2 (520) may communicate with memory device 506. Controller 514 may be configured to coordinate operation of the flash memory 518 and for internal memory management operations.

Controller 514 may include a processor and an associated memory. Code operable to cause the controller 514 to perform a variety of operations may be stored in the memory. Examples of operations include, but are not limited to, managing host communications, mapping host requests to NAND addresses, executing NAND operations, reporting completion status to host, etc. The functions may be segmented in a variety of ways, such as upper layers of firmware (which do not use physical addresses) and lower layers firmware (which use physical addresses). Examples of upper layers of firmware include, but are not limited to, memory management layer (MML), BLM (Block Link Manager), LLS (Low Level Sequencer), and some FCL (Flash Control Layer). Examples of lower layers of firmware include, but are not limited to, FPS (Flash Protocol Sequencer) and some FCL.

The memory associated with the controller 514 may be a random-access memory, read-only memory, programmable memory, or other type of volatile or non-volatile memory. The processor of the controller 514 may comprise any type of arithmetic logic unit, such as one or more general processors, digital signal processors, application specific integrated circuits, field programmable gate arrays, digital circuits, optical circuits, analog circuits, combinations thereof, or other now known or later-developed devices for analyzing and processing data. The processor may implement the set of instructions or other software program, such as manually-programmed or computer-generated code for implementing logical functions.

Flash interface module 516 comprises electronics configured to provide a communication interface between the controller 514 and the flash memory 518. Flash memory 518 comprises one example of non-volatile memory. Other types of non-volatile memory are contemplated.

In one embodiment, host interface "A" of FIG. 5 may comprise standard eMMC I/F balls. Host interface "B" for Host #2 (520) as illustrated in FIG. 5 may comprise multiple communication lines, some of which are configured to communicate with part or all of the hardware core of memory device 506, such as one, some or all of host interface module 512, controller 514, flash interface module 516, and flash memory 518. Further, in one embodiment, host interface "B" may comprise Vendor Specific Function (VSF) balls.

Memory device 506 further includes I/F switch 508 and logic 510. In operation, one of host interface "A" or host interface "B" is electrically connected with the hardware core of the memory device 506. In one embodiment, one or more switches, such as I/F switch 508, and the logic to control the one or more switches, such as logic 510, enables the electrical connection between one of host interface "A" or host interface "B".

The I/F switch 508, controlled by logic 510, may enable electrical connection of one of the host interfaces with the hardware core. For example, logic 510 may be configured to control I/F switch 508 in one or more configurations. In one configuration, one or more communication lines from host interface "A" are electrically connected to host interface module 512. In a second configuration, one or more communication lines from host interface "B" are electrically connected to host interface module 512.

Logic 510 receives as input one or more signals. As shown in FIG. 5, the one or more signals input to logic 510 are communicated via one or more communication lines from host interface "B", such as via one or more VSF pins.

As shown in FIG. 5, the memory device 506 is embedded within Host #1 (502)). In this regard, Host #2 (520) may communicate with the memory device 506 by communicating via Host #1 (502).

In one embodiment, the interface for Host #1 (502) is enabled by default. In such a default (or normal) mode, one, some, or all of the lines from host interface "A" are connected, via I/F switch 508, to interface "D". As shown in FIG. 5, interface "D" is electrically connected to host interface module 512, and, in one embodiment, may serve as the interface to the hardware core of memory device 506. For example, host interface "A" may comprise 8 electrical connections (for DATA), CLK and CMD lines. In one embodiment, Host #1 may further provide a PWR line in order to power the memory device 506. As shown in FIG. 5, host interface "A" comprises 10 lines and interface "D" comprises 10 electrical connections. Thus, in the default mode, the 10 lines from host interface "A" are electrically connected to interface "D". In the default mode, Host #1 (502) may communicate, for example, with controller 514 of memory device 506 via a designated protocol, such as the eMMC protocols discussed herein.

Further, in one embodiment, PWR from Host #1 (502) powers the memory device 506 regardless of the configuration of I/F switch 508. In an alternate embodiment, the powering of the memory device may be switched from Host #1 (502) in default mode to Host #2 (520) in test mode.

Logic 510 may send a switch control signal (or multiple switch control signals) to I/F switch 508 in order to change the configuration of I/F switch 508 from the default configuration to a non-default configuration (e.g., a test configuration). In the non-default configuration, I/F switch 508 is configured to electrically connect one, some, or all of the lines from host interface "B" to interface "D". As shown in FIG. 5, a subset (or less than all) of the lines from host interface "B" are electrically connected to interface "D" in the non-default configuration. More specifically, one or more signals are input via host interface "B" to logic 510 in order for logic 510 to control I/F switch 508 to the desired configuration. Alternatively, the one or more signals input to logic 510 may be communicated via an interface different from host interface "B".

At least one of the signals input to logic 510 may be used by logic 510 to determine the configuration of I/F switch 508. For example, the signal may be indicative to logic 510 for logic 510 to instruct I/F switch 508 to a specific configuration. More specifically, the signal may be indicative of a specific configuration of I/F switch 508 (e.g., the second configuration), and in response to receipt of the signal, logic 510 may send a switch control command to I/F switch 508 to the specific configuration (e.g., send a switch control command so that I/F switch 508 configures itself to the second configuration).

Optionally, logic 510 may receive one or more signals in addition to the signal to determine the configuration of I/F switch 508. For example, logic 510 may receive a password signal in order for logic 510 to determine whether to accept the signal to determine the configuration of I/F switch 508. In particular, logic 510 may compare the password signal and, if matching a password stored in logic 510, comply with the switch control command.

Responsive to an input signal to logic 510 to change to the second configuration (e.g., wherein one, some or all of the communication lines from host interface "B" are electrically connected to the hardware core of the integrated circuit 102), logic 510 sends a switch control command in order to command I/F switch 508 to change to the second configuration. As illustrated in FIG. 5, interface "C", which is a subset of host interface "B", is electrically connected to interface "D".

In one embodiment, logic 510 is configured to control circuitry on memory device 506 in addition to I/F switch 508. Thus, logic 510 may comprise different modes, one of which may be a test mode to enable Host #2 (520) to communicate with the hardware core of memory device 506. Further, logic 510 may use two VSF pins to input CLK and DATA in order to input both a password and a mode. The password may be of a predetermined length, such as 128 bits, and the mode may be of a predetermined length, such as 16 bits. Other lengths are contemplated. The mode may be indicative of the test mode.

Further, in one embodiment, the I/F switch 508 and logic 510 transition from the configuration for test mode to the configuration for default mode by powering down memory device 506. More specifically, Host #1 powers memory device 506 via PWR line. When removing power from PWR line, memory device may reboot and, in turn, reconfigure itself upon startup in the default state whereby host interface "A" is electrically connected to interface "D".

In an alternative embodiment, the I/F switch 508 and logic 510 transition from the configuration for test mode to the configuration for default mode by receiving one or more signals from Host #2 (520). As discussed above, transition from the default mode to the test mode may be accomplished using two VSF pins to input CLK and DATA. The two VSF pins may likewise be used in order to input both a password and a mode indicating transition back to the default mode.

Though FIG. 5 illustrates two host interfaces for memory device 506, in an alternate embodiment, additional host interfaces may be included such that the memory device 506 may communicate with more than two hosts.

Figure 6:
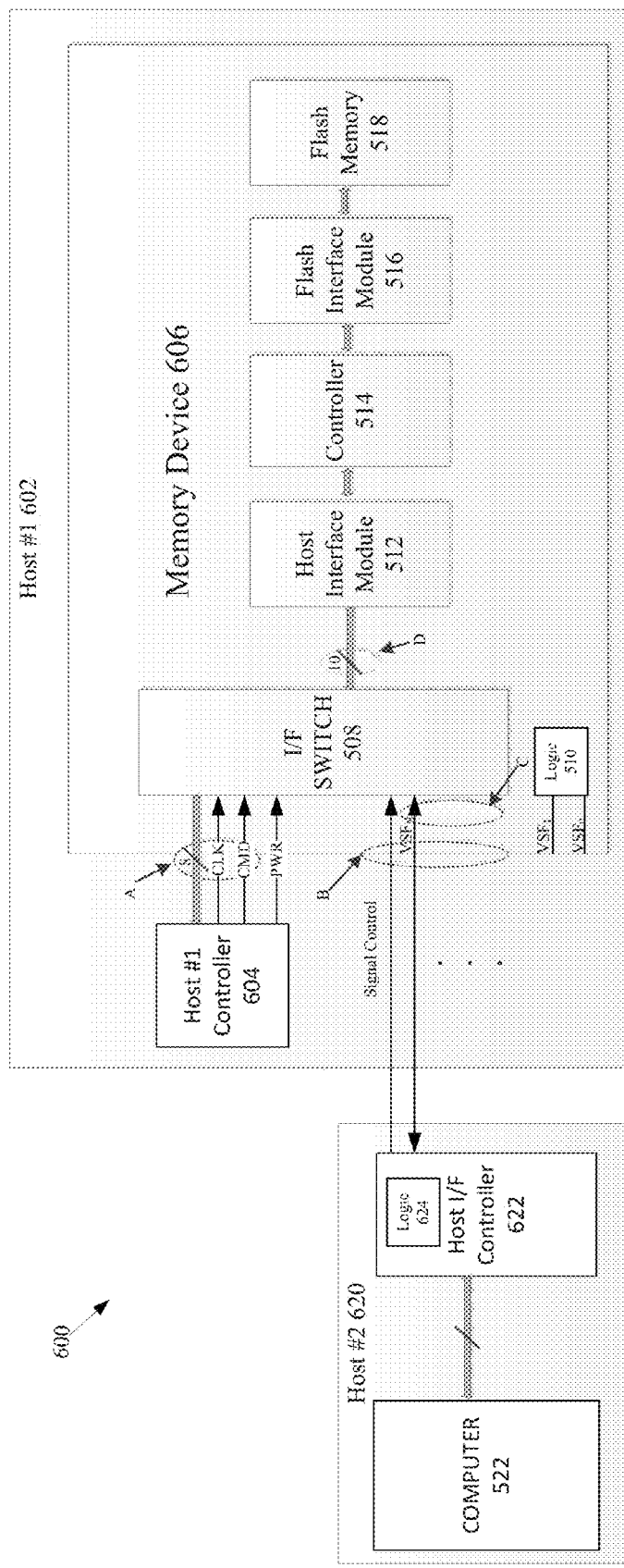
FIG. 6 illustrates a second example of a memory device communicating with two different hosts via two respective host interfaces that use the same hardware.

FIG. 6 illustrates a second example of a memory device 606 communicating with two different hosts 602, 620 via two respective host interfaces that use the same hardware. More specifically, FIG. 6 illustrates a block diagram of a system 600 that including Host #1 (602) and Host #2 (620) communicating with memory device 506 via two separate interfaces using the same host protocol.

FIG. 6 is similar to FIG. 5 except that the logic for determining the configuration of I/F switch 508 is located external to the memory device 606. In particular, in FIG. 5, logic 510 used to control I/F switch 508 is located within memory device 506. In FIG. 6, logic 510 is still present; however, logic 510 is not used to control I/F switch 508. Instead logic 624 is located in Host I/F controller 622, external to memory device 606. In this regard, logic 624 may generate a switch control signal (or multiple switch control signals), similar to the switch control signal generated by logic 510. However, the switch control signal generated by logic 624 may be communicated via host interface "B" and input to I/F switch 508, as illustrated in FIG. 6. In still an alternate embodiment, in the instance where logic 624 is located external to memory device 606, memory device 606 need not include logic 510.

Figure 7:
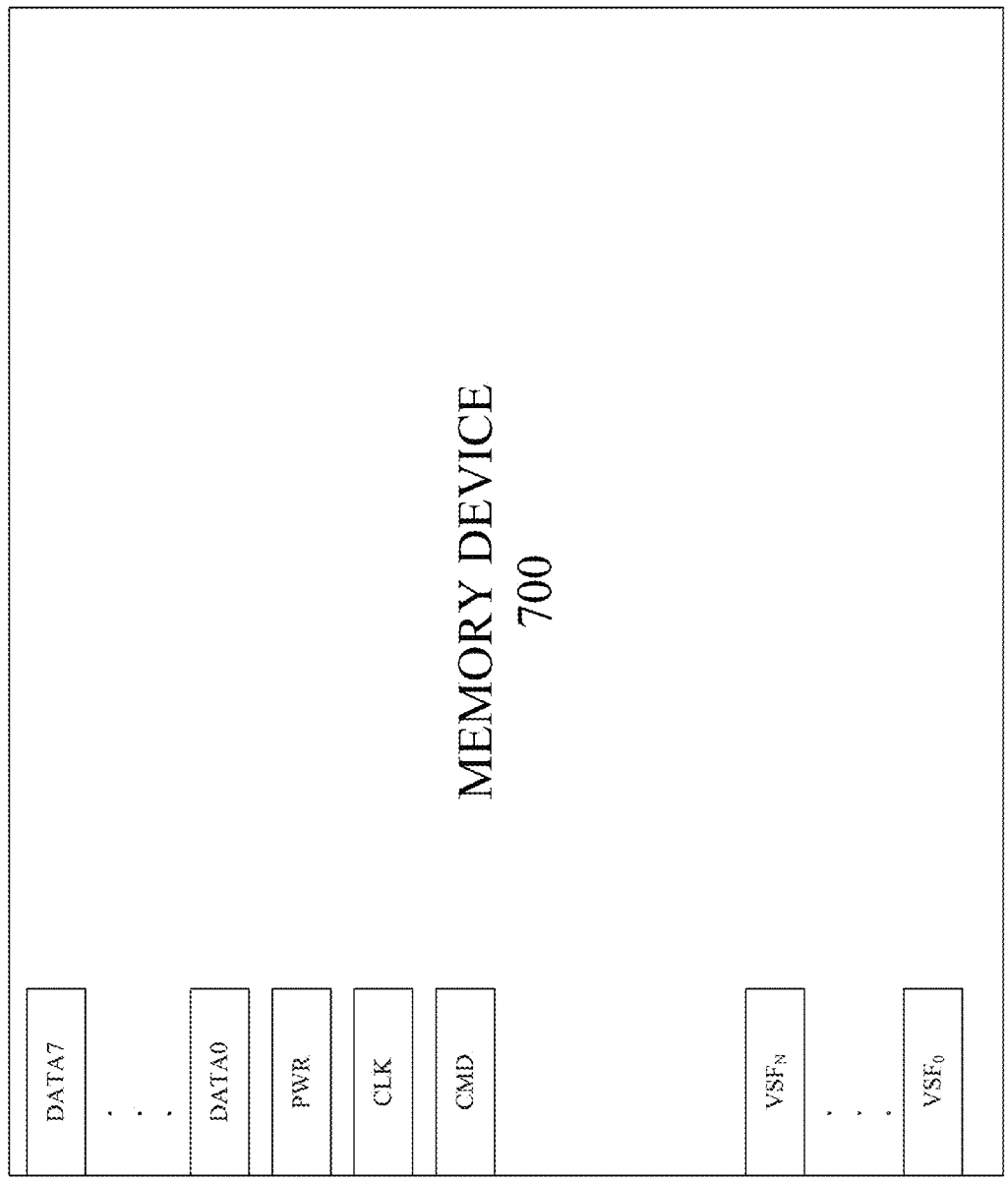
FIG. 7 illustrates the top view of the pins of the integrated circuit package of FIG. 5.

FIG. 7 illustrates the top view of the pins of the memory device package 700 of FIG. 5. Multiple pins of the memory device package 700 may be connected, such as via soldering, to a host. For example, the memory device package 700 may be connected to Host #1 (502), as discussed above. In this regard, various pins of the memory device package 700 may be connect to Host #1 (502), such as DATA0 . . . DATA7, PWR, CMD, CLK, $VSF_0$ . . . $VSF_N$.

DATA0 . . . DATA7, CMD, CLK may comprise the contacts associated with host interface "A", as discussed above. Some or all of $VSF_0$ . . . $VSF_N$ may comprise the contacts associated with host interface "B", as discussed above. Further, memory device package 700 is configured with logic 510 resident therein. In this regard, one or more signal lines may be input to logic 510. For example, a single line, or multiple lines, may be input to logic 510.

Figure 8:
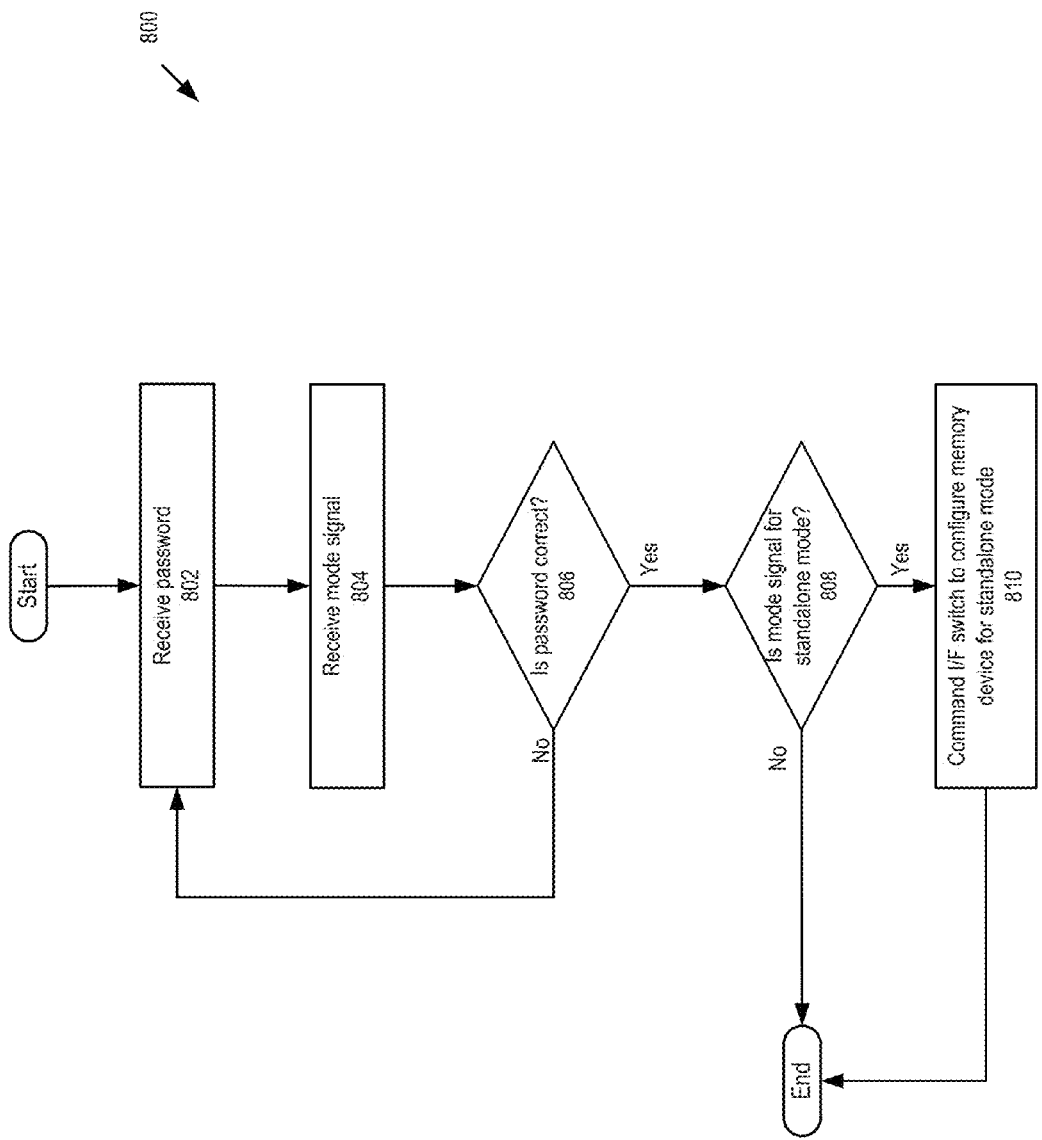
FIG. 8 is a flow diagram of the memory device illustrated in FIG. 5.

FIG. 8 is a flow diagram 800 of the memory device illustrated in FIG. 5. At 802, a password is received. At 804, a mode signal is received. At 806, the password is determined to be correct. As discussed above, logic 510 may determine whether a password matches a previously stored password. If the password is determined to be correct, at 808, it is then determined if the mode signal is indicative of configuring the memory device for standalone testing. If so, at 810, the I/F switch is commanded to configure the memory device into standalone testing. If the password is determined to be incorrect, the flow diagram 800 returns to 802. As discussed above, in one embodiment, logic 510 requires a correct password in order to switch the mode of the memory device. In an alternate embodiment, a password is not necessary in order to switch the mode of the memory device.

FIG. 8 illustrates a particular sequence, such as the receipt of the password, receipt of the mode signal, the determination whether the password is correct, and determination of the mode signal. The particular sequence illustrated is merely for illustration purposes. Other sequences are contemplated.

Using the additional communication channel as described above enables an additional host (such as Host #2 illustrated in FIGS. 1-5) to communicate with the memory device. The communication through the additional channel may be used for a variety of purposes, such as, without limitation, downloading firmware (FW) upgrades, monitoring and/or upgrading configuration data, accessing data within the memory device, etc. Discussed below are examples of the use of the additional communication channel. In this regard, the additional host may communicate with the memory device even after the memory device is installed in a host platform (e.g., the communication via the additional communication channel may be performed without removing the memory device from the host platform).

By using the described multiple modes, failure issues may be investigated without the need to extract the integrated circuit (such as the memory device) from the host. Further, developers may be able to easily configure and test the memory device on an end user platform (such as Host #2 described herein). Further, both the client side application (such as included in Host #1) and firmware side (such as included in Host #2) may be easily enhanced for supporting new functionalities. In addition, a customer using an integrated circuit (such as the memory device) may be able to easily integrate the integrated circuit into a larger system.

As stated above, the memory device with the additional communication channel enables greater communication with the memory device even after installation of the memory device within a host platform. For example, a debug shell application may be provided with a set of built in commands which may be run on a host, such as a smartphone or a standard PC. Those that integrate the memory device may be able to configure the controller of the memory device directly from this application without the need for executing their own code. In this regard, identifying integrating problems, such as in integrating a memory device within a host, may be performed more quickly.

As other examples, being able to configure host interface features directly to the controller enables one or more of the following: configure secure trim1 ranges; present the saved ranges to the user; apply secure trim2 on the saved ranges; present device pre-end-of-life to the user; present device health; invoke sanitize; read directly from card specific data (CSD) registers; apply power off notification; run repartitioning \ restore to default \ format; and control directly the controller's power feed. As noted above, the examples given are merely for illustration purposes. Other examples are contemplated.

Further, the following functionalities may be enabled: perform read\write\erase directly to\from the memory of the controller without the need of host code; load various dedicated applications to the controller's RAM for debugging\testing\analyzing even when the memory device is installed in the host platform; perform production to the controller by a single command (e.g., ability to emulate production of manufacture); change configuration files (file 42, 212 etc. . . . ) which are responsible for how device works (performance aspects and other thresholds that FW uses); perform SFFU; perform firmware (FW) change that is non-destructive (e.g., provide "hooks" to change modify firmware, such as management tables); extract EL (error log) and Big Dump+erase EL if it is full in order to be able to collect more information; change the EL (error log) configuration cyclic/not cyclic (e.g., cyclic rewriting when section of memory assigned to the error log is full); have access to Management tables for read and update; and add the ability to fix bugs or other errors dynamically (e.g., if the bugs are related to Management table that needs a different configuration).

The present disclosure illustrates various logic for controlling the I/F switch, such as logic 110, logic 206, logic 510, and/or logic 524. Logic, such as logic 110, logic 206, logic 510, and/or logic 524, may include a processor and an associated memory. Code operable to cause the logic to perform a variety of operations, such as discussed herein, may be stored in the memory. The memory associated with the logic may be a random-access memory, read-only memory, programmable memory, or other type of volatile or non-volatile memory. The processor of the logic may comprise any type of arithmetic logic unit, such as one or more general processors, digital signal processors, application specific integrated circuits, field programmable gate arrays, digital circuits, optical circuits, analog circuits, combinations thereof, or other now known or later-developed devices for analyzing and processing data. The processor may implement the set of instructions or other software program, such as manually-programmed or computer-generated code for implementing logical functions.

Although components and functions are described that may be implemented in particular embodiments with reference to particular standards and protocols, the components and functions are not limited to such standards and protocols. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the intent is to cover all such modifications, enhancements, and other embodiments, which fall within the true spirit and scope of the description. Thus, to the maximum extent allowed by law, the scope is to be determined by the broadest permissible interpretation of any claims relying on the description and their equivalents, and shall not be restricted or limited by the foregoing detailed description.

What is claimed is:

1. An electronic integrated circuit configured to communicate with a first host and a second host, the electronic integrated circuit comprising:

electronic circuitry configured to perform at least one function and configured to communicate with the first host and the second host using a host protocol, wherein the electronic integrated circuit is configured for hardware installation inside the first host and wherein the second host is external to the first host;

a package configured to house the electronic circuitry;

a first set of electrical contacts on an exterior of the package and configured for communication with the first host via the host protocol;

a second set of electrical contacts on the exterior of the package and configured for communication with the second host via the host protocol, wherein the second host uses one or more electrical contacts on an external interface of the first host and the second set of electrical contacts on the exterior of the package in order to communicate with the electronic circuitry; and a host interface switch configured to input one or more signals to select some or all of the first set of electrical contacts or to select some or all of the second set of electrical contacts in order for one of the first host or the second host to communicate with the electronic circuitry via the host protocol, wherein the one or more signals are indicative of a mode of the electronic integrated circuit, the mode being selected from at least a test mode and a non-test mode, wherein, in response to the one or more signals being indicative of the non-test mode, the host interface switch is configured to select the some or all of the first set of electrical contacts in order for the first host to communicate with at least a part of the electronic circuitry in the non-test mode, and wherein, in response to the one or more signals being indicative of the test mode, the host interface switch is configured to select the some or all of the second set of electrical contacts in order for the second host to test at least a part of the electronic circuitry.

2. The electronic integrated circuit of claim 1, wherein the electronic circuitry comprises a hardware core;

wherein the host interface switch comprises one or more switches configured as an interface between the hardware core and the some or all of the first set of electrical contacts and the some or all of the second set of electrical contacts;

wherein the host interface switch comprises a first configuration in which the some or all of the first set of electrical contacts are in communication with the hardware core;

wherein the host interface switch comprises a second configuration in which the some or all of the second set of electrical contacts are in communication with the hardware core;

wherein, in the first configuration, the hardware core is configured to communicate, via the first set of electrical contacts and the host interface switch, with the first host; and wherein, in the second configuration, the hardware core configured to communicate, via the second set of electrical contacts and the host interface switch, with the second host.

3. The electronic integrated circuit of claim 1, further comprising:

a mode signal contact on the exterior of the package and configured to input a mode signal; and logic for generating the one or more signals, the logic configured to:

receive the mode signal;

determine the mode of the electronic integrated circuit based on the received mode signal; and generate the one or more signals in order to select one of the first set of electrical contacts or the second set of electrical contacts based on the determined mode.

4. The electronic integrated circuit of claim 1, wherein the exterior of package comprises a signal contact configured to input the one or more signals to the electronic integrated circuit.

5. The electronic integrated circuit of claim 1, wherein the electronic circuitry comprises a memory controller and a memory.

6. The electronic integrated circuit of claim 5, further comprising:

a mode signal contact on the exterior of the package and configured to input a mode signal; and logic for generating the one or more signals, the logic configured to:

receive the mode signal;

determine a mode of the memory controller based on the received mode signal, the mode of the memory controller selected from at least the test mode and the non-test mode; and in response to determining that the mode of the memory controller is the test mode, generate the one or more signals in order to select the second set of electrical contacts, the second set of electrical contacts configured for the second host to test one or both of the memory controller or the memory.

7. A memory device configured to communicate with a first host and a second host, the memory device comprising:

electronic circuitry configured to communicate using a host protocol and comprising a memory controller and a memory;

a package configured to house the electronic circuitry;

a first set of electrical contacts on an exterior of the package and configured for communication with the first host via the host protocol;

a second set of electrical contacts on the exterior of the package and configured for communication with the second host via the host protocol;

a host interface switch configured to input one or more signals to select some or all of the first set of electrical contacts or to select some or all of the second set of electrical contacts in order for one of the first host or the second host to communicate with the electronic circuitry via the host protocol;

a mode signal contact on the exterior of the package and configured to input a mode signal; and logic for generating the one or more signals, the logic configured to:

receive the mode signal;

determine a mode of the memory controller based on the received mode signal, the mode of the memory controller selected from at least a test mode and a non-test mode; and in response to determining that the mode of the memory controller is the test mode, generate the one or more signals in order to select the second set of electrical contacts, the second set of electrical contacts configured for the second host to test one or both of the memory controller or the memory, wherein the memory device is configured for hardware installation inside the first host; and wherein the memory device is configured to communicate with the second host, the second host being external to the first host.

8. The memory device of claim 7, wherein the memory device is configured for soldering within the first host;

wherein the second set of electrical contacts are for communication with the second host; and wherein, when the second set of electrical contacts are selected, the memory device is configured for communication with the second host through the first host in order for the second host to test the memory device without removal of the memory device from within the first host.

9. The memory device of claim 8, wherein the host interface switch comprises a first configuration in which the first set of electrical contacts are in communication with the memory controller;
   wherein the host interface switch comprises a second configuration in which the second set of electrical contacts are in communication with the memory controller;
   wherein, in the first configuration, a first host controller in the first host is configured to communicate, via the first set of electrical contacts and the host interface switch, with the memory controller; and
   wherein, in the second configuration, a second host controller in the second host is configured to communicate, via electrical lines in the first host, the second set of electrical contacts and the host interface switch, with the memory controller.

10. The memory device of claim 9, wherein the first set of electrical contacts comprises at least one power contact configured to receive power from the first host; and
    wherein the at least one power contact is not controlled by the host interface switch so that the memory controller and the memory are electrically connected to the at least one power contact regardless of configuration of the host interface switch.

11. A method for an electronic integrated circuit to communicate with a first host and a second host, the method comprising:
    receiving, in at least a portion of the electronic integrated circuit, one or more signals indicative of a non-test mode;
    based on the one or more signals indicative of a non-test mode, selecting some or all of a first set of electrical contacts in order for the first host to communicate with at least a part of electronic circuitry of the electronic integrated circuit in the non-test mode;
    communicating, via the first set of electrical contacts using a host protocol, with the first host, the electronic integrated circuit being hardware embedded within the first host, the first set of electrical contacts on an exterior of a package of the electronic integrated circuit;
    receiving one or more signals indicative of a test mode, to select a second set of electrical contacts for testing of at least a part of the electronic integrated circuit, the second set of electrical contacts on the exterior of the package of the electronic integrated circuit; and
    based on the one or more signals indicative of the test mode received, switching, using a host interface switch, from communicating with some or all of the first set of electrical contacts to communicating with some or all of the second set of electrical contacts using the host protocol in order for the second host to test the at least a part of the electronic integrated circuit, the second host being external to the first host,
    wherein, while the electronic integrated circuit is hardware embedded within the first host, communicating with the second host to test the at least a part of the electronic integrated circuit comprises using some or all of the second set of electrical contacts and using one or more electrical contacts on an external interface of the first host.

12. The method of claim 11, wherein the electronic circuitry comprises a hardware core;
    wherein the host interface switch comprises one or more switches configured as an interface between the hardware core and the some or all of the first set of electrical contacts and the some or all of the second set of electrical contacts;
    wherein the host interface switch comprises a first configuration in which the some or all of the first set of electrical contacts are in communication with the hardware core;
    wherein the host interface switch comprises a second configuration in which the some or all of the second set of electrical contacts are in communication with the hardware core;
    wherein switching, using a host interface switch, from communicating with the some or all of the first set of electrical contacts and communicating with the some or all of the second set of electrical contacts comprises:
        switching from the first configuration, in which the hardware core is configured to communicate, via the first set of electrical contacts and the host interface switch, with the first host, to the second configuration, in which the hardware core is configured to communicate, via the second set of electrical contacts and the host interface switch, with the second host.

13. The method of claim 11, further comprising:
    receiving a mode signal via a mode signal contact on the exterior of the package;
    determining a mode of the electronic integrated circuit based on the received mode signal, the mode being selected from at least the test mode and the non-test mode; and
    generating the one or more signals in order to select one of the first set of electrical contacts or the second set of electrical contacts based on the determined mode.

14. The method of claim 11, wherein receiving the one or more signals comprises receiving the one or more signals from a signal contact on the exterior of the package of the electronic integrated circuit.

15. The method of claim 11, wherein the electronic circuitry comprises a memory controller and a memory.

16. The method of claim 15, further comprising:
    receiving a mode signal via a mode signal contact on the exterior of the package;
    determining a mode of the memory controller based on the received mode signal, the mode of the memory controller selected from at least the test mode and the non-test mode; and
    in response to determining that the mode of the memory controller is the test mode, generating the one or more signals in order to select the second set of electrical contacts, the second set of electrical contacts configured for the second host to test one or both of the memory controller or the memory.

17. The method of claim 16, wherein the electronic integrated circuit is configured for soldering within the first host;
    wherein the second set of electrical contacts are for communication with the second host; and
    wherein switching comprises configuring the electronic integrated circuit for communication with the second host through the first host in order for the second host to test the electronic integrated circuit without removal of the electronic integrated circuit from within the first host.

18. The method of claim 17, wherein the host interface switch comprises a first configuration in which the first set of electrical contacts are in communication with the memory controller;
    wherein the host interface switch comprises a second configuration in which the second set of electrical contacts are in communication with the memory controller;

wherein communicating with the first host comprises the memory controller communicating, in the first configuration, with a first host controller in the first host; and further comprising the memory controller, in the second configuration, communicating with a second host controller in the second host.

19. The method of claim 18, wherein the first set of electrical contacts comprises at least one power contact configured to receive power from the first host; and further comprising electrically connecting the memory to the at least one power contact regardless of configuration of the host interface switch.

\* \* \* \* \*